Nov. 4, 1958 U. FALCONI 2,858,717
UNIVERSAL DRILLING AND REAMING MACHINES AND THE LIKE
Filed July 11, 1955 2 Sheets-Sheet 1
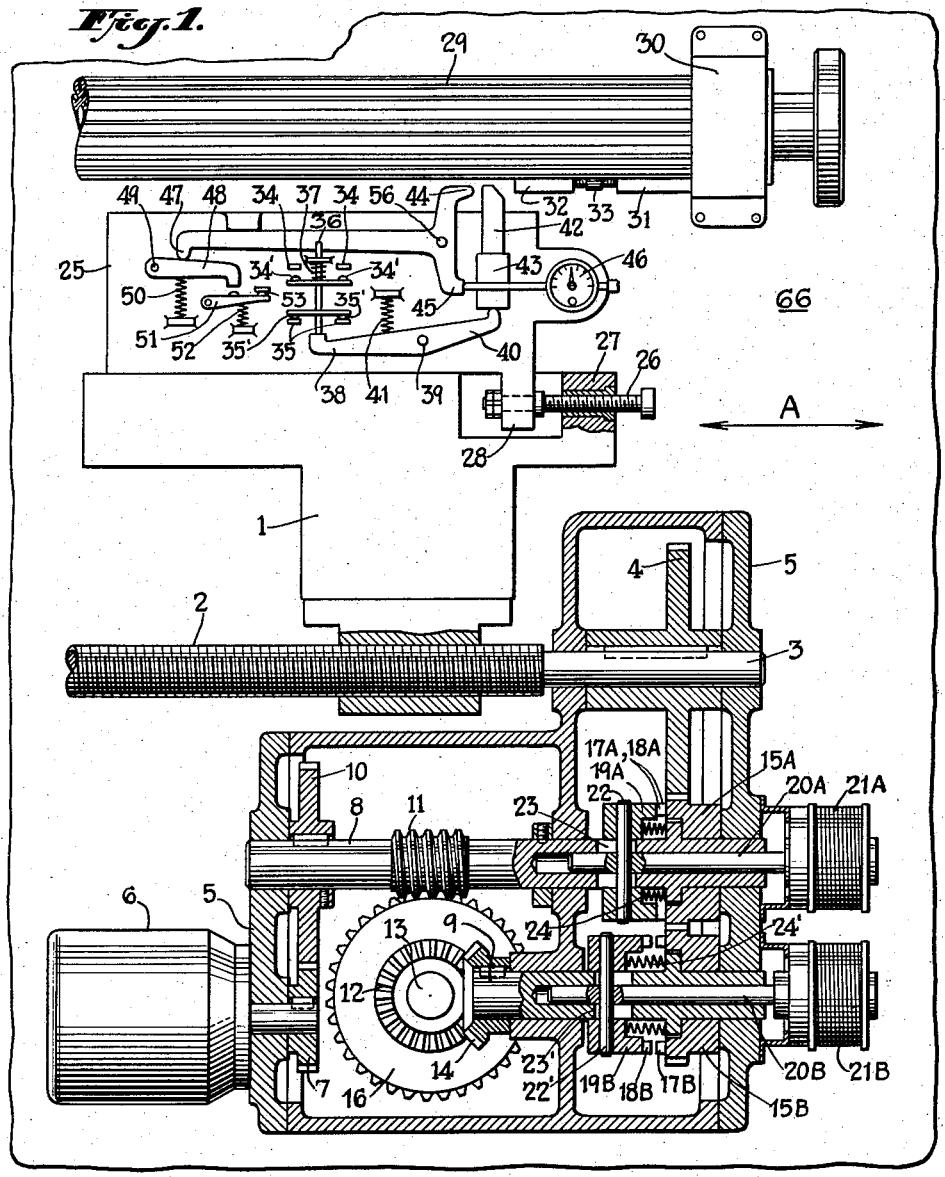
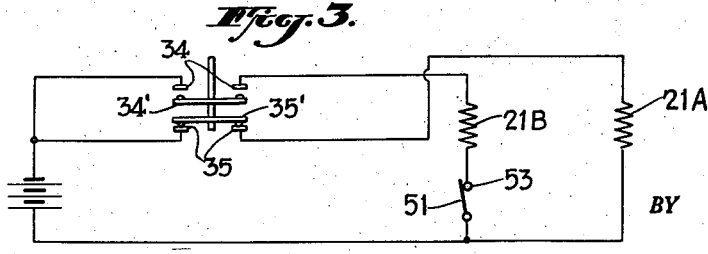
INVENTOR.
UGO FALCONI.
BY
ATTORNEY.

Nov. 4, 1958 U. FALCONI 2,858,717
UNIVERSAL DRILLING AND REAMING MACHINES AND THE LIKE
Filed July 11, 1955 2 Sheets-Sheet 2
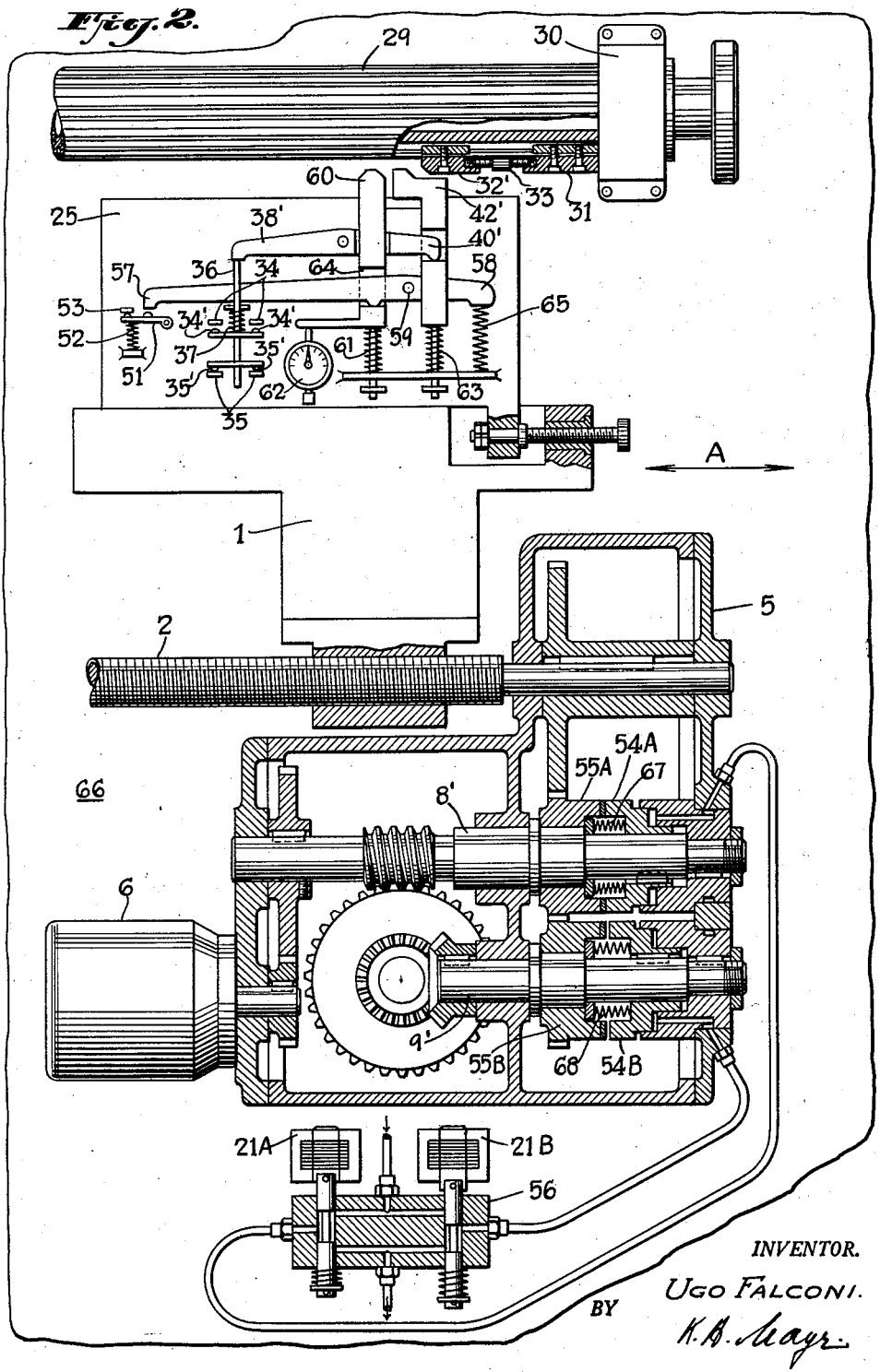

United States Patent Office 2,858,717
Patented Nov. 4, 1958

2,858,717

UNIVERSAL DRILLING AND REAMING MACHINES AND THE LIKE

Ugo Falconi, Milan, Italy, assignor to Officine Meccaniche Ceruti S. A.

Application July 11, 1955, Serial No. 521,300

Claims priority, application Italy July 12, 1954

4 Claims. (Cl. 77—63)

The present invention relates to a drive for the screws for moving the slides of drilling and reaming machines and the like, more particularly of machine tools adapted to produce an indefinite number of like work pieces having accurately spaced holes or bores, for example as disclosed in my Patent No. 2,648,237.

In a machine of the type disclosed in Patent No. 2,648,237 a drill is supported on a vertically displaceable slide and the work is supported on a slide which is transversely horizontally displaceable on a reciprocable slide whose path is aligned with the drill. By consecutively placing the vertically displaceable slide and the transversely horizontally displaceable slide into desired relative positions the drill may be made to make any number of holes in desired positions in the work. For initially setting the slides to drill the first hole and for subsequently resetting the slides after completion of each hole a high speed drive is provided for the major part of the setting path and a slow speed drive is provided for the very last part of the setting path.

The drives actuate screws for displacing the slide in the conventional manner. A stop is longitudinally movably provided in each flute of a fluted rotatable drum placed alongside each slide and parallel to the screw actuating the slide. These stops are abutted by a device mounted on each slide and adapted to stop the high speed drive and to initiate the slow speed drive of the respective spindle and to finally stop the drive when the respective slide has reached the desired position.

The present invention relates to a simplified high-slow speed drive and to a device for controlling the drives in a machine tool, for example, as disclosed in the Patent No. 2,648,237.

The drive according to the present invention includes a two-speed transmission interposed between an electric motor and the screw for moving a slide supporting the tool or the work for adjusting the relative position of the tool and the work in a reaming or drilling machine, the two speeds of the transmission being individually controlled by a solenoid-actuated clutch. The current for engaging the solenoids is controlled by switches which are consecutively operated by actuating means adapted to be consecutively engaged by a setting device so that the slide is moved at high speed towards the setting device and is moved at slow speed after reaching the setting device and before the slide is accurately stopped in the desired operating position by conventional means.

The novel features which are considered characteristic of the invention are set forth with particularity in the appended claims. The invention itself however and additional objects and advantages thereof will best be understood from the following description of embodiments thereof when read in conjunction with the accompanying drawings in which:

Fig. 1 is a diagrammatic part sectional view of a mechanism according to the invention;

Fig. 2 is a diagrammatic part sectional view of a modified mechanism according to the invention;

Fig. 3 is a wiring diagram for the mechanisms shown in Figs. 1 and 2.

The same numerals designate the same parts in the three figures.

Referring more particularly to Fig. 1 of the drawing, numeral 1 designates a slide of a conventional machine tool, the slide being adapted to reciprocate on a support 66 in the directions shown by the arrow A. The support 66 may either be stationary and connected with the machine bed or it may be slidable on the machine bed. The movement of the slide 1 is effected by means of a spindle or screw 2 whose end 3 carries a spur gear wheel 4 driven by a pinion 15A. A solenoid 21A is mounted on the housing 5 of the aforementioned gear wheels which housing is supported by the support 66. The armature 20A of the solenoid 21A extends into a longitudinal bore of a shaft 8 which is parallel to the spindle 2 and carries a worm 11 and also a spur gear wheel whose teeth mesh with those of a pinion 7 which is driven by an electric motor 6 mounted on the gear housing 5. The worm 11 drives a worm wheel 16 on a shaft 13 which is at a right angle to the shaft 8 and carries a bevel-gear wheel 12 meshing with a bevel-gear wheel 14 on a shaft 9 which is parallel to the shaft 8. The shaft 9 carries a spur gear wheel 15B whose teeth mesh with those of the wheel 15A. The shaft 9 has a longitudinal bore into which extends a shaft 20B forming the armature of a solenoid 21B mounted on the housing 5.

Each of the wheels 15A and 15B forms one half of a claw-clutch. The other halves of the clutches, 19A and 19B, respectively, are axially slidable mounted on the shafts 8 and 9, respectively, and held against rotation thereon by pins 22 and 22', respectively. The pins 22 and 22' extend through the armature shaft 20A and 20B, respectively, and through longitudinal slots 23 and 23', respectively, in the shafts 8 and 9, respectively. The clutch-halves 15A and 19A are provided with mating claws 17A and 18A, respectively, and the clutch-halves 15B and 19B are provided with mating claws 17B and 18B, respectively.

Springs 24 and 24' are individually interposed between collars on the shafts 8 and 9 and the clutch-halves 19A and 19B respectively tending to disengage the clutches.

The slide 1 supports a box 25 which is displaceable on the slide in the same directions as the slide is displaceable on its support. Displacement of the box relatively to the slide is effected by means of a screw 26 screwed into a portion 27 of the slide 1 and having an end rotatable and secured against axial movement in a protuberance 28 of the box 25. The ends of a drum 29 whose surface is fluted in longitudinal direction are supported in bearings 30 mounted on the support 66.

A setting device is longitudinally slidable in each flute of the drum, the setting devices individually including a member 31 which can be fixed in its flute and a member 32 connected with the member 31 by means of a micrometer screw 33.

The box 25 supports an electric switch comprising stationary contacts 34 and 35 and a movable contact member provided with contacts 34' and 35' adapted to cooperate with the contacts 34 and 35, respectively. The switches 34, 34' and 35, 35' are individually interposed in the electric circuits of the solenoids 21A and 21B. A spring 37 tends to move the contact member to close the contacts 35, 35' and to open the contacts 34, 34'. The contact member includes a pin 36 engaging the arm 38 of a two-arm lever which swings on a pivot 39, the end of the other arm 40 of the lever engaging a finger 42 slidable in a guide 43 which is fast on the box 25. A spring 41 maintains engagement of the lever arm 40 and the finger 42. The latter is adapted to engage the setting member 32.

A three-arm lever including two aligned arms 44 and 45 and an arm 47 extending perpendicularly to the arms 44, 45 is pivoted by a pin 56 to the box 25. The end of the arm 47 engages a lever 48 pivoted at 49 to the box 25 and pressed against the arm 47 by means of a spring 50. The lever 48 is adapted to actuate a switch lever 51 which is normally pressed against a contact 53 by means of a spring 52. The switch 51, 53 is interposed in the electric circuit operating the solenoid 21B. The arm 44 is adapted to abut against the member 32 while the arm 45 abuts against the end of a rod extending from a comparator 46. The comparator is so set that it indicates zero at the moment the switch 53 is opened.

The device operates as follows:

It is assumed that the mechanism is used in connection with a horizontal work supporting slide 1 mounted in the work slide of a boring or reaming machine and movable transversely to the work slide and that a plurality of spaced holes must be worked on a number of work pieces. A work piece is placed on the work supporting slide with the line on which a row of holes must be worked parallel to the direction of the movement of the slide and the work supporting slide is so placed that the first hole can be worked, i. e., drilled or reamed. A setting device 31, 32 is placed adjacent to the finger 42 and the micrometer screw 33 is manipulated until the member 32 abuts against the lever 44, at which moment the comparator 46 is in 0 position.

Thereupon, the fluted drum 29 is revolved by one flute, the slide 1 is placed in the position to work the second hole, and the device 31, 32, 33 in the new flute is set, and so on until the mechanism, particularly the setting devices are adjusted for all the holes to be worked.

After adjustment of the mechanism, the individual parts may be in the position shown in Fig. 1 in which the clutch 15B, 19B, which effects slow rotation of the screw 2, is disengaged and the clutch 15A, 19A, which effects fast rotation of the screw 2 is engaged, causing quick movement of the slide 1 from left to right in Fig. 1. The slanted top of the finger 42 contacts the setting member 32 and the finger is moved downwards, in Fig. 1, because of the movement of the slide 1, swinging the lever 38, 40 clockwise and moving the pin 36 against the action of the spring 37 for opening the contacts 35, 35' and closing the contacts 34, 34' so that the solenoid 21A is de-energized and the solenoid 21B is energized. The screw is now driven slowly until the arm 44 of the three-arm lever 44, 45, 47 contacts the setting member 32. Upon continued movement of the slide 1 to the right, the lever 44, 45, 47 is turned counterclockwise and, at the moment at which the arm 45 returns the comparator to 0 position, the arm 47 opens the switch 53 by actuating the levers 48 and 51. This causes deenergization of the solenoid 21B so that both clutches 15A, 19A, and 15B, 19B, are now disengaged and the slide 1 is stopped exactly at the position in which the next hole to be worked is in the correct position.

When a hole is completed, the motor 6 is reversed and the solenoid 21A is energized by conventional means, not shown, so that the slide 1 is quickly moved to the left until it reaches a conventional stopping device, not shown, which stops the slide and reverses the motor 6 for rotating the screw 2 in the direction for moving the slide 1 to right. In the meantime, the drum 29 is rotated to bring the setting device 31 to 33 in another flute of the drum 29 in line with the finger 42 and the end of the lever 44. When the finger 42 abuts against the new member 32, the clutch 15A, 19A is disengaged and the clutch 15B, 19B is engaged so that the slide moves slowly to the right until the end of the lever 44 abuts against the member 32 and the clutch 15B, 19B is disengaged and the drive of the screw 2 is stopped at the moment when the slide 1 and the work piece connected therewith are in the exact position for working the next hole.

If there is already a hole in each of the work pieces, the procedure is as follows:

The first work-piece is placed on the slide and the hole is aligned with a mandrel by a conventional device including a cam and a comparator. Thereupon the respective setting device 31, 32, 33 is placed on the drum 29 in the position after working of the hole, whereupon the mechanism is set for working subsequent holes in the same workpiece. When placing the second work-piece which also has one finished hole, the mandrel is realigned with the hole in the second work-piece. The adjusting screw 26 is manipulated until the comparator 46 indicates 0. The mechanism is then set for working the other holes in the second work-piece without touching the screw 26.

The claw-clutches 15A, 19A and 15B, 19B may be of any suitable conventional design.

In order to be able to use simple friction clutches, the clutches may be operated by a hydraulic or pressure fluid actuated device interposed between the solenoid 21A, 21B and the clutches. This modification of the invention is illustrated in Fig. 2. The clutch-halves 55A and 55B are rotatably mounted on shafts 8' and 9', respectively. The mating clutch-halves 54A and 54B are axially movably but not rotatably mounted on the shafts 8' and 9', respectively. Each of the clutch halves 54A and 54B has a piston-like portion extending into a cylindrical portion inserted in the housing 5 and also as bearing for the shafts 8' and 9'. Each cylindrical portion communicates with a source of supply of and a relief for a pressure fluid through a valve 56 controlling the flow of pressure fluid to and from the cylindrical portions. The valves are actuated by solenoids 21A and 21B in the same manner as the pins 20A and 20B (Fig. 1) are actuated.

In the modification according to Fig. 2, the levers 44, 45, 47 and 48 in the embodiment shown in Fig. 1 are replaced by a two-arm lever 57, 58. The lever 57, 58 is pivoted at 59 to the box 25. The arm 57 extends through an opening 64 in a member 60 which rests on a spring 61 and extends through an opening in a two-arm lever 38', 40' for vertical guidance. The arm 57 is pressed against the lower surface of the opening 64 by a spring 65 which is weaker than the spring 61. The top of the member 60 has an inclined edge mating with an inclined edge of the setting member 32' so that the member 60, upon engagement with the member 32', is pushed down against the action of the spring 61. The member 60 has a lateral arm abutting against a pin extending from a comparator 62.

The configuration of the top of the member 60 and of the end of the member 32' are so that the former can pass underneath the latter in contradistinction to the arrangement according to to Fig. 1, in which such passage is not possible.

The arm 57 actuates a switch lever 51 in the same manner as does the arm 47 and the lever 48 of the mechanism shown in Fig. 1. The finger 42 of the device according to Fig. 1 is replaced by a member 42' having a cavity receiving the arm 40' of a lever 40'/38' which is turned clockwise against the action of a spring 63 and actuates the pin 36 of a switch member for operating the switches 34, 34' and 35, 35' in the same manner as the lever 38, 40 of the device shown in Fig. 1 actuates the pin 36.

The device according to the invention and equivalent devices can be applied to the vertical as well as to the horizontal slide of a conventional reaming or drilling machine and the devices for the two slides can be synchronized. The device can be used in connection with a horizontal as well as with a vertical drilling machine.

What is claimed is:

1. In a setting mechanism for a slide supporting the work or the tool on the frame of a universal reaming and drilling machine, the combination of a screw rotatably mounted on the machine frame and extending through a threaded bore in the slide for moving the slide in the direction of the rotation axis of the screw upon rotation of the latter, a motor mounted on the machine frame, a power transmission interposed between said motor and said screw for rotating the latter by said motor, said transmission including a first part for transmitting power at high speed from said motor to said screw and a second part for transmitting power at slow speed from said motor to said screw, a first clutch interposed in said first part, and a second clutch interposed in said second part for selectively transmitting power at high speed or at slow speed from said motor to said screw, springs individually connected with said clutches tending to hold said clutches in disengaged positions, a first solenoid provided with an armature operatively connected with said first clutch for engaging said first clutch against the action of the respective spring upon energization of said first solenoid, a second solenoid provided with an armature operatively connected with said second clutch for engaging said second clutch against the action of the respective spring upon energization of said second solenoid, an electric circuit for each of said solenoids, support means movably connected with said slide to move in the direction of the rotation axis of said screw, means for adjusting and fixing the relative position of said support means and of said slide, a setting member adjustably supported by the machine frame adjacent to said support means, a first switch means mounted on said support means and including two switches individually interposed in the electric circuits of said solenoids, resilient means operatively connected with said switches for normally closing the switch interposed in the circuit of said first solenoid and opening the switch interposed in the circuit of said second solenoid, actuating means mounted on said support means and operatively connected with said first switch means and including a finger adapted to be abutted and moved by said setting member when the slide moves into a predetermined position for actuating said first switch means against the action of said resilient means for opening the switch interposed in the circuit of said first solenoid and closing the switch interposed in the circuit of said second solenoid, a second switch means mounted on said support means and including a switch interposed in the electric circuit of said second solenoid, resilient means operatively connected with said last mentioned switch for normally closing said last mentioned switch, an actuating member mounted on said support means and operatively connected with said second switch means and having a portion adapted to be abutted by said setting member when the slide moves beyond the position in which said finger was abutted by said setting member, for actuating said second switch means for opening the switch of said second switch means, and a comparator operatively connected with said actuating member and mounted on said support means for indicating the opening position of said second switch means whereby accurate uniform adjustment of the position of any number of work pieces consecutively set up on said slide relatively to said setting member is effected by actuation of said means for adjusting and fixing the relative position of said support means and of said slide according to the indications of said comparator.

2. In a setting mechanism as defined in claim 1, and wherein said clutches are claw clutches.

3. In a setting mechanism as defined in claim 1, and wherein said clutches are friction clutches, each clutch being provided with pressure fluid actuated means for engaging the clutch, pressure fluid supply and relieve conduits connected with each clutch, a valve in each of said conduits, the armatures of said solenoids being individually connected with said valves for opening said valves and supplying pressure fluid to the respective conduit for engaging the respective clutch upon energization of the respective solenoid and for closing said valve and relieving pressure fluid from the respective conduit for disengaging the respective clutch upon deenergization of the respective solenoid.

4. In a setting mechanism as defined in claim 1, and wherein said finger is displaceable in a direction at a right angle to the direction of movement of the slide and is displaced by said setting member to make room for passage of the actuating member of said second switch toward said setting member.

References Cited in the file of this patent
UNITED STATES PATENTS

| | | |
|---|---|---|
| 2,299,007 | Bundy | Oct. 13, 1942 |
| 2,481,383 | Bickel et al. | Sept. 6, 1949 |
| 2,648,237 | Falconi | Aug. 11, 1953 |